G. W. N. YOST.
Seats for Harvesters.
No. 137,816. Patented April 15, 1873.
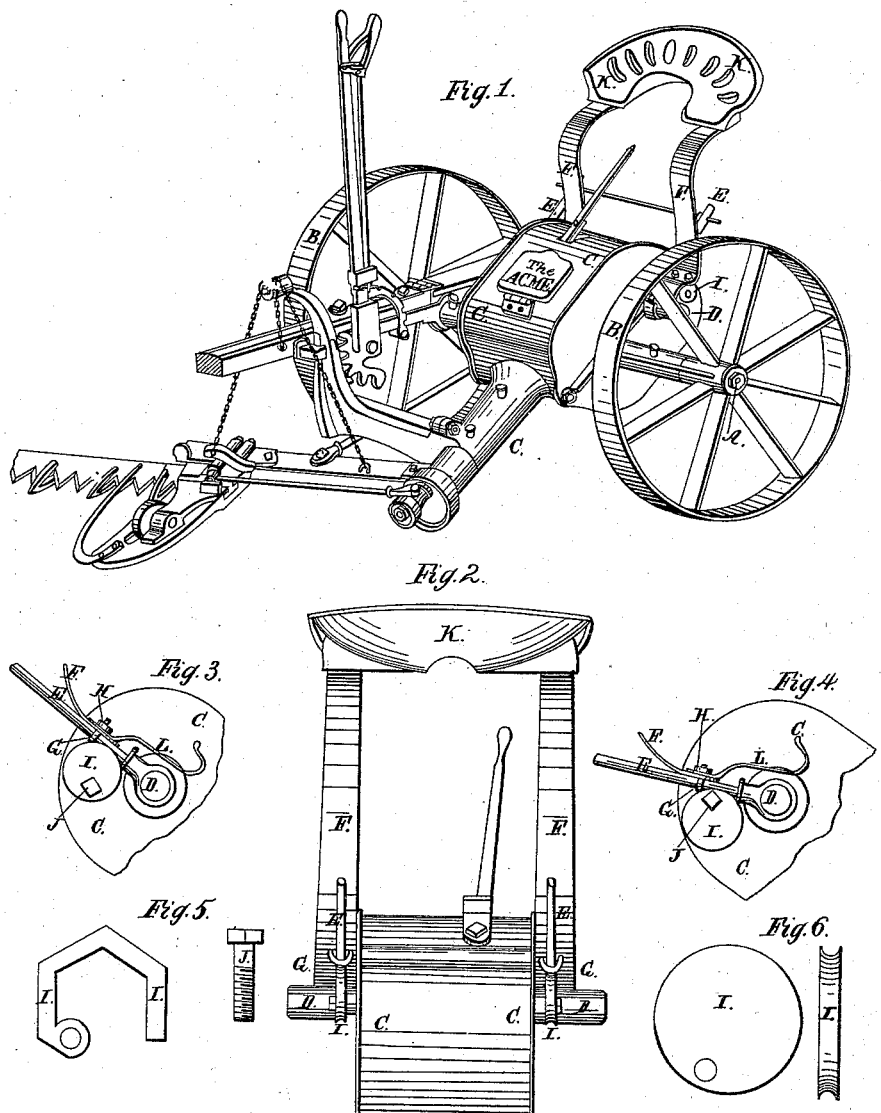

UNITED STATES PATENT OFFICE.

GEORGE W. N. YOST, OF CORRY, PENNSYLVANIA, ASSIGNOR TO "ACME MOWER AND REAPER COMPANY," OF NEW YORK, N. Y.

IMPROVEMENT IN SEATS FOR HARVESTERS.

Specification forming part of Letters Patent No. 137,816, dated April 15, 1873; application filed September 23, 1872.

*To all whom it may concern:*

Be it known that I, GEORGE W. N. YOST, of Corry, Pennsylvania, have invented an Improved Mowing and Reaping Machine, which I call the "Acme," of which the following is a specification:

The nature of that part of the invention included in this division, and to which the application for a patent therefor is confined, is an adjustable seat and foot-rest.

The accompanying drawing and the following description thereof fully illustrate that part of the invention included in this division.

Of the drawing, Figure 1 represents a view of my improved mowing-machine. Fig. 2 represents a rear view of the seat attached to the main frame. Fig. 3 represents a view of the position of the supporting-arms when the seat is lifted up high. Fig. 4 represents a view of the position of the supporting-arms when the seat is let down low. Fig. 5 represents a view of one form of changeable rests for the supporting-arms, and Fig. 6 represents a view of another form of changeable rests for the supporting-arms. Fig. 7 represents a view of a foot-rest detached from the seat.

The following is the description: A represents a main axle of a mowing or reaping machine. B represents a driving-wheel on each end of the main axle A. C represents an inclosing-box main frame hinged on the main axle A between the driving-wheels B. D represents a hinge-lug, a part of or rigidly attached to each side of the main frame C, and extended laterally parallel with the main axle A. E represents an arm, hinged on each hinge-lug D of the main frame C, and extended nearly horizontally at a right angle to the main axle A. F represents a seat-spring on each supporting-arm E, and extended upwardly. G represents a ring or loop attached to the lower end of each seat-spring F, and over the contiguous supporting-arm E, and adapted to be moved to and from on the arm for convenience. I make this ring in the form of a staple, and put it up astride or over the arm and through holes in the seat-spring. H represents a screw-nut on each end of each staple G of each seat-spring F, by which the seat-spring is screwed fast to its supporting-arm E. I represents a cam pivoted to each side of the main frame C under a supporting-arm, E, as a rest for the arm to lie on. J represents a screw-pivot through each cam I, and screwed into the main frame C. K represents a seat for the operator, attached to the upper ends of the springs F. L represents a foot-rest rigidly fastened to the bottom of each seat-spring F, over a supporting-arm, E, by the loop or staple G and screw-nuts H.

The cam I may be a wheel, as in Figs. 1, 2, 3, 4, and 6; or it may be a many-sided ring, as in Fig. 5, or in any other suitable form.

If the cam I is a wheel the pivot J is put through the cam out of the center nearer one edge, as in Figs. 1, 2, 3, 4, and 6; and, if a many-sided ring, the pivot is put through one corner, and equally out of the center, as in Fig. 5, so that in either case when the cam revolves on its pivot its circumference will move in an eccentric line. This will enable the seat K on the supporting-arm E, which rests on the cams I, to be raised or lowered, as in Figs. 3 and 4, which makes the seat adjustable in an upward and downward direction.

By loosening the screw-nuts H, the seat K, with the rings or loops G, can be moved to and from lengthwise on the supporting-arms E, which makes the seat adjustable in a forward and backward direction. The foot-rests L, being attached to the seat-springs F, will move up or down or forward or backward as the seat is moved, being adjustable in the same way that the seat is adjustable. Thus the seat is doubly adjustable, can be moved lengthwise, according to the weight of the operator, so as to balance the cutting apparatus, or up or down, according as the machine is reaping or mowing.

I make a groove in the edges of the cams I for the supporting-arms E to lie in, as shown in Fig. 6.

The following is a summary of that part of the invention included in this division.

I claim—

1. The combination of adjustable cams with an operator's seat hinged to the main frame of a mowing or reaping machine, substantially as described.

2. The combination of adjustable cams with foot-rests attached to an operator's seat hinged to the main frame of a mowing or reaping machine, substantially as described.

G. W. N. YOST.

Witnesses:
 CHAS. BIRD,
 JAMES DENSMORE.